(12) United States Patent
Omote et al.

(10) Patent No.: US 11,397,498 B2
(45) Date of Patent: Jul. 26, 2022

(54) ELECTRODE FILM AND METHOD FOR MANUFACTURING SAME

(71) Applicant: NISSHA CO., LTD., Kyoto (JP)

(72) Inventors: Ryomei Omote, Kyoto (JP); Kazuhiro Nishikawa, Kyoto (JP); Yoshihiro Sakata, Kyoto (JP); Takeshi Nishimura, Kyoto (JP); Takakuni Sunahase, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 318 days.

(21) Appl. No.: 16/640,014

(22) PCT Filed: Jul. 31, 2018

(86) PCT No.: PCT/JP2018/028740
§ 371 (c)(1),
(2) Date: Feb. 18, 2020

(87) PCT Pub. No.: WO2019/044339
PCT Pub. Date: Mar. 7, 2019

(65) Prior Publication Data
US 2020/0241702 A1 Jul. 30, 2020

(30) Foreign Application Priority Data
Aug. 30, 2017 (JP) .............................. JP2017-166074

(51) Int. Cl.
*G06F 3/044* (2006.01)
(52) U.S. Cl.
CPC .. *G06F 3/0446* (2019.05); *G06F 2203/04103* (2013.01); *G06F 2203/04112* (2013.01)
(58) Field of Classification Search
CPC ......... G06F 3/0446; G06F 2203/04103; G06F 2203/04112; B32B 2255/06; B32B 2255/26; B32B 2255/28
See application file for complete search history.

(56) References Cited

U.S. PATENT DOCUMENTS

| 2012/0273336 A1 | 11/2012 | Kuriki |
| 2015/0313008 A1* | 10/2015 | Spath ...................... G06F 3/047 345/174 |

(Continued)

FOREIGN PATENT DOCUMENTS

| CN | 102473049 A | * | 5/2012 | ............ G06F 3/0446 |
| CN | 103901650 A | * | 7/2014 | ............ G06F 3/0446 |

(Continued)

OTHER PUBLICATIONS

Machine translation, Kimura, Chinese Pat. Pub. No. CN105308542A, translation date: Feb. 25, 2022, Clarivate Analytics, all pages. (Year: 2022).*

(Continued)

*Primary Examiner* — Victoria K. Hall
(74) *Attorney, Agent, or Firm* — Global IP Counselors, LLP

(57) ABSTRACT

A method for manufacturing an electrode film includes the steps of laminating a metal layer and a black photoresist layer sequentially on a first main surface of a transparent base material, subjecting the black photoresist layer to patterning in a mesh shape by partially exposing the black photoresist layer and performing development, processing the metal layer into a metal mesh electrode by subjecting the metal layer to etching by using the black photoresist layer subjected to the patterning as an etching mask until the metal layer has a width smaller than a width of a thin wire line constituting a mesh of the black photoresist layer, and covering an upper surface and both side surfaces of a thin wire line constituting a mesh of the metal mesh electrode with the black photoresist layer by heating and softening the black photoresist layer to cause the black photoresist layer softened to flow.

14 Claims, 9 Drawing Sheets

(56) References Cited

U.S. PATENT DOCUMENTS

| | | | | |
|---|---|---|---|---|
| 2016/0370902 A1* | 12/2016 | Aridomi | ............... | G06F 3/0446 |
| 2017/0131814 A1* | 5/2017 | Aridomi | ............... | G06F 3/0412 |
| 2018/0095570 A1* | 4/2018 | Hong | .................. | H01L 51/5284 |
| 2018/0308903 A1* | 10/2018 | Jeong | .................. | G06F 3/04164 |

FOREIGN PATENT DOCUMENTS

| | | | | | |
|---|---|---|---|---|---|
| CN | 105308542 A | * | 2/2016 | ......... | G02F 1/13338 |
| CN | 106663505 A | * | 5/2017 | ........... | H05K 9/0096 |
| CN | 107709000 A | * | 2/2018 | ............. | B32B 15/08 |
| CN | 104461156 B | * | 7/2018 | ........... | G06F 3/0443 |
| JP | 2010-205961 A | * | 9/2010 | ............. | B32B 15/08 |
| JP | 2010205961 A | | 9/2010 | | |
| JP | 2011134311 A | | 7/2011 | | |
| JP | 2012-198879 A | * | 10/2012 | ............. | G06F 3/045 |
| JP | 2012198879 A | | 10/2012 | | |
| JP | 2013-235315 A | * | 11/2013 | ............. | G06F 3/041 |
| JP | 2013235315 A | | 11/2013 | | |
| JP | 2015211167 A | | 11/2015 | | |
| JP | 2016-115237 A | * | 6/2016 | ............. | G06F 3/041 |
| JP | 2016115237 A | | 6/2016 | | |
| JP | 2008310551 A | | 12/2018 | | |

OTHER PUBLICATIONS

Machine translation, Yamato, Chinese Pat. Pub. No. CN102473049A, translation date: Feb. 25, 2022, Clarivate Analytics, all pages. (Year: 2022).*

Machine translation, Zhou, Chinese Pat. Pub. No. CN103901650A, translation date: Feb. 25, 2022, Clarivate Analytics, all pages. (Year: 2022).*

Machine translation, Nada, Chinese Pat. Pub. No. CN106663505A, translation date: Feb. 25, 2022, Clarivate Analytics, all pages. (Year: 2022).*

Machine translation, Nagata, Chinese Pat. Pub. No. CN107709000A, translation date: Feb. 25, 2022, Clarivate Analytics, all pages. (Year: 2022).*

Machine translation, Zhang, Chinese Pat. Pub. No. CN104461156A, translation date: Feb. 25, 2022, Clarivate Analytics, all pages. (Year: 2022).*

Machine translation, Hayashi, Japanese Pat. Pub. No. JP-2013-235315-A, translation date: Feb. 25, 2022, Espacenet, all pages. (Year: 2022).*

Machine translation, Kakita, Japanese Pat. Pub. No. JP-2016-115237-A, translation date: Feb. 25, 2022, Espacenet, all pages. (Year: 2022).*

Machine translation, Tokunaga, Japanese Pat. Pub. No. JP-2012-198879-A, translation date: Feb. 25, 2022, Espacenet, all pages. (Year: 2022).*

Machine translation, Toyoshima, Japanese Pat. Pub. No. JP-2010-205961-A, translation date: Feb. 25, 2022, Espacenet, all pages. (Year: 2022).*

English translation, Written Opinion of International Searching Authority, International Application No. PCT/JP2018/028740, dated Oct. 23, 2018, all pages. (Year: 2018).*

International Search Report in PCT/JP2018/028740 dated Oct. 23, 2018.

* cited by examiner

ELECTRODE FILM AND METHOD FOR MANUFACTURING SAME

CROSS REFERENCES TO RELATED APPLICATIONS

This application is a U.S. National stage of International Application No. PCT/JP2018/028740 filed on Jul. 31, 2018. This application claims priority to Japanese Patent Application No. 2017-166074 filed with Japanese Patent Office on Aug. 30, 2017. The entire disclosure of Japanese Patent Application No. 2017-166074 is hereby incorporated herein by reference.

TECHNICAL FIELD

The present disclosure relates to an electrode film including a metal mesh as an electrode and a method for manufacturing the electrode film.

BACKGROUND

In recent years, a touch panel has become popular as an input device for various types of electronic devices. Various types of touch panels such as a resistive film type, a resistive film type (resistive type), and an electrostatic capacity type (capacitive type) are put into practical use.

In general, a touch panel uses an electrode member for a touch panel obtained by forming a transparent conducting film including an indium tin oxide (ITO) thin film on one surface of a transparent base material including a glass plate, a polyethylene terephthalate film, or the like (JP 2008-310551 A).

However, a transparent conducting film including an ITO thin film uses rare metal called indium (rare earth element), and thus is expensive, and the transparent conducting film has too high resistance (surface resistance ratio) to provide increased area of a touch panel. Thus, it is difficult to satisfy demands for cost reduction and a larger screen.

Then, there has been proposed an electrode member for a touch panel obtained by forming, in place of a transparent conducting film of an ITO thin film, a metal mesh including a metallic thin wire line pattern on a transparent base material (JP 2011-134311 A). According to the metal mesh, lower cost and lower resistance than the ITO thin film can be achieved.

When the metal mesh electrode is used as an electrode for a touch panel, there arises a problem of invisibility as compared to a transparent electrode including an ITO thin film. Additionally, a metal layer forming a mesh pattern exerts relatively high reflectance. Thus, external light is dispersed and reflected to cause the mesh pattern to be visually recognized, and image contrast of a touch panel device decreases. Then, a blackened layer is disposed in an observer side of the metal layer. The blackened layer can enhance invisibility of the mesh pattern and image contrast to improve visibility of an image.

Such an electrode for a touch panel is manufactured by first laminating a metal thin film and a blackened layer on a transparent base material, and next subjecting the metal thin film and the blackened layer to patterning by etching using a photolithographic technique.

SUMMARY

However, even according to the metal mesh electrode including the blackened layer, the blackened layer is present only in an upper surface of the metal layer subjected to patterning by etching, and thus, invisibility of the mesh pattern and visibility of an image are not sufficiently achieved due to side surfaces from which the metal layer is exposed.

An object of the present disclosure is to provide an electrode film excellent in invisibility of a mesh pattern and visibility of an image and a method for manufacturing the electrode film.

Some aspects will be described below as solutions to the problems. These aspects can be combined optionally as needed.

An electrode film according to the present disclosure includes a transparent base material, a metal mesh electrode provided on a first metal surface of the transparent base material, and a black photoresist layer provided in an upper surface and both side surfaces of a thin wire line constituting a mesh of the metal mesh electrode.

In the electrode film, the upper surface and both the side surfaces of the thin wire line constituting the mesh of the metal mesh electrode are covered with the black photoresist layer. Accordingly, when the electrode film is used for an electrode for a touch panel, scattering and reflection of external light in the upper surface and both the side surfaces of the thin wire line can be suppressed. Thus, a mesh pattern is not visually recognized, and image contrast of a touch panel can be enhanced to improve visibility of an image.

Additionally, the black photoresist layer may be formed to cover the upper surface of the thin wire line by an even film thickness, and to cover an edge of the upper surface of the thin wire line and each of both the side surfaces of the thin wire line with a curved surface. Accordingly, the metal mesh electrode covered with the black photoresist layer, that is, an upper surface of a black mesh electrode is visually recognized as being homogeneous due to smoothness of the upper surface of the black mesh electrode. Meanwhile, the upper surface and both side surfaces of the black mesh electrode have no corner portion, and have an ambiguous boundary between the upper surface and each of both the side surfaces of the black mesh electrode. Thus, when the electrode film is seen obliquely, the mesh pattern is not conspicuous.

A method for manufacturing an electrode film according to the present disclosure includes the steps of laminating a metal layer and a black photoresist layer sequentially on a first main surface of a transparent base material, subjecting the black photoresist layer to patterning in a mesh shape by partially exposing the black photoresist layer and performing development, processing the metal layer into a metal mesh electrode by subjecting the metal layer to etching by using the black photoresist layer subjected to the patterning as an etching mask until the metal layer has a width smaller than a width of a thin wire line constituting a mesh of the black photoresist layer, and covering an upper surface and both side surfaces of a thin wire line constituting a mesh of the metal mesh electrode with the black photoresist layer by heating and softening the black photoresist layer to cause the black photoresist layer to flow.

In this manufacturing method, the metal mesh electrode is obtained by subjecting the metal layer to etching until the metal layer has a width smaller than a width of the thin wire line constituting the mesh of the black photoresist layer, and the black photoresist layer is heated and softened. Accordingly, the black photoresist layer softened flows, and thus not only the upper surface but also both the side surfaces of the thin wire line constituting the mesh of the metal mesh electrode can be covered with the black photoresist layer.

Additionally, in the electrode film and the method for manufacturing the electrode film, the black photoresist layer may include a multi-layered configuration including a heat flowable photoresist layer and a heat non-flowable photoresist layer provided on the heat flowable photoresist layer, and at least any one of the layers may be colored.

Accordingly, in the manufacturing steps, when the upper surface and both the side surfaces of the thin wire line constituting the mesh of the metal mesh electrode are covered with the black photoresist layer by heating and softening the black photoresist layer to cause the black photoresist layer softened to flow, the heat flowable photoresist layer being a lower layer loses evenness exerted before heating and flows whereas the heat non-flowable photoresist layer being an upper layer does not flow while maintaining evenness exerted before heating.

The heat non-flowable photoresist layer being the upper layer covers the upper surface and both the side surfaces of the thin wire line of the metal mesh electrode while maintaining evenness. Thus, a boundary between the upper surface and each of the side surfaces of the thin wire line, that is, a so-called shoulder portion is prevented from jutting out of the black photoresist layer and being exposed.

Note that, after the heat non-flowable photoresist layer being the upper layer flows, and a distal end of the heat non-flowable photoresist layer comes into contact with the transparent base material, the heat flowable photoresist layer being the lower layer does not further largely flow. This is because the thin wire line, the heat non-flowable photoresist layer being the upper layer, and the transparent base material define a shape of the heat flowable photoresist layer being the lower layer.

Meanwhile, due to flowability of the heat flowable photoresist layer, the heat flowable photoresist layer being the lower layer fills a gap between the side surfaces of the thin wire line and the heat non-flowable photoresist layer being the upper layer. The side surfaces of the thin wire line include irregularities due to etching, but due to flow of the heat flowable photoresist layer being the lower layer, the black photoresist layer can cover the side surfaces of the thin wire line without generating fine bubbles. As a result, the black photoresist layer firmly adheres to the side surfaces of the thin wire line.

A softening point of the heat non-flowable photoresist layer may be higher than a softening point of the heat flowable photoresist layer by 20° C. or more.

When the black photoresist layer includes only two layers including the heat flowable photoresist layer and the heat non-flowable photoresist layer, a thickness ratio of the heat flowable photoresist layer and the heat non-flowable photoresist layer may be from 1:2 to 1:4. Accordingly, evenness of all the black photoresist layer increases.

Additionally, a rustproof resist layer may be provided between the heat flowable photoresist layer and the heat non-flowable photoresist layer. Alternatively, the heat flowable photoresist layer may contain a rustproof agent.

Accordingly, even when corrosive liquid enters from the outside after product completion, or even under an environmental test such as high-temperature and high-humidity, corrosion does not progress to the metal mesh electrode, and electrical characteristics can be maintained.

Additionally, only the heat non-flowable photoresist layer may be colored. The heat non-flowable photoresist layer maintains evenness exerted before heating, and accordingly color unevenness is less likely to be caused in the black photoresist layer. Therefore, more excellent invisibility of a mesh pattern and visibility of an image can be obtained.

In contrast, only the heat flowable photoresist layer may be colored. Accordingly, the film thickness of the layer having a block color and covering both the side surfaces of the thin wire line of the metal mesh electrode is reduced, and thus the width of the thin wire line having a block color can be reduced as viewed from the front. Therefore, more excellent invisibility of a mesh pattern and visibility of an image can be obtained.

An electrode film according to the present disclosure can enhance invisibility of a mesh pattern and visibility of an image by devising a blackened layer.

DETAILED DESCRIPTION

Now, with reference to the drawings, description will be made on embodiments.

1. First Embodiment (1) Electrode Film

Figure 1:
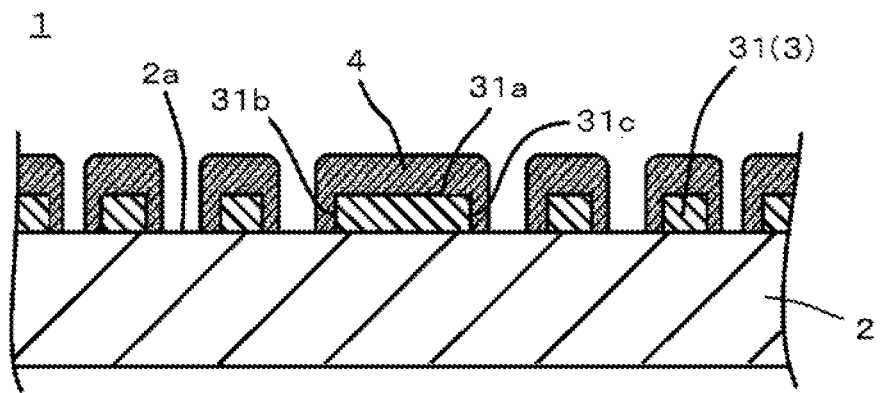
FIG. 1 is a schematic cross-sectional view illustrating a configuration of an electrode film in a first embodiment.

FIG. 1 is a schematic cross-sectional view illustrating a configuration of an electrode film in a first embodiment. For easy understanding, illustration is simplified.

An electrode film 1 includes a transparent base material 2, a metal mesh electrode 3 provided on a first main surface 2a of the transparent base material 2, and a black photoresist layer 4 being a single layer and provided in an upper surface 31a and both side surfaces 31b and 31c of a thin wire line 31 constituting a mesh of the metal mesh electrode 3.

Transparent Base Material

The transparent base material 2 is not particularly limited as long as a material of the transparent base material 2 has a transmittance of 90% or more, and a film such as a polyethylene terephthalate (PET) film, a polycarbonate (PC) film, a polymethyl methacrylate (PMMA) film, a polyethylene naphthalate (PEN) film, a polyethersulfone (PES) film, a cyclic olefin copolymer (COC) film, a triacetylcellulose (TAC) film, a polyvinylalcohol (PVA) film, a polyimide (PI) film, a polystyrene (PS) or biaxial oriented PS (BOPS) film, or a laminate thereof is used. Preferably, a polyethylene terephthalate (PET) film, a polyimide (PI) film, a polycarbonate (PC) film, or a triacetylcellulose (TAC) film may be used. Additionally, a glass film can also be used.

Additionally, the transparent base material 2 may be a single layer or a laminate in which two or more layers are attached to each other. Further, the transparent base material 2 may include a configuration including a ¼λ retardation film, for example, a drawn COP.

As for the thickness of the transparent base material 2, normally, the thickness of each single film is 20 μm or more, and the total thickness of the films is 500 μm or less. This is because when the thickness of each single film is less than 20 μm, handling at the time of manufacturing the film is difficult, and because when the total thickness of the films exceeds 500 μm, translucency decreases.

Metal Mesh Electrode

The metal mesh electrode 3 is a pattern layer of a metal mesh used as, for example, an electrode for a touch panel.

Figure 3A:
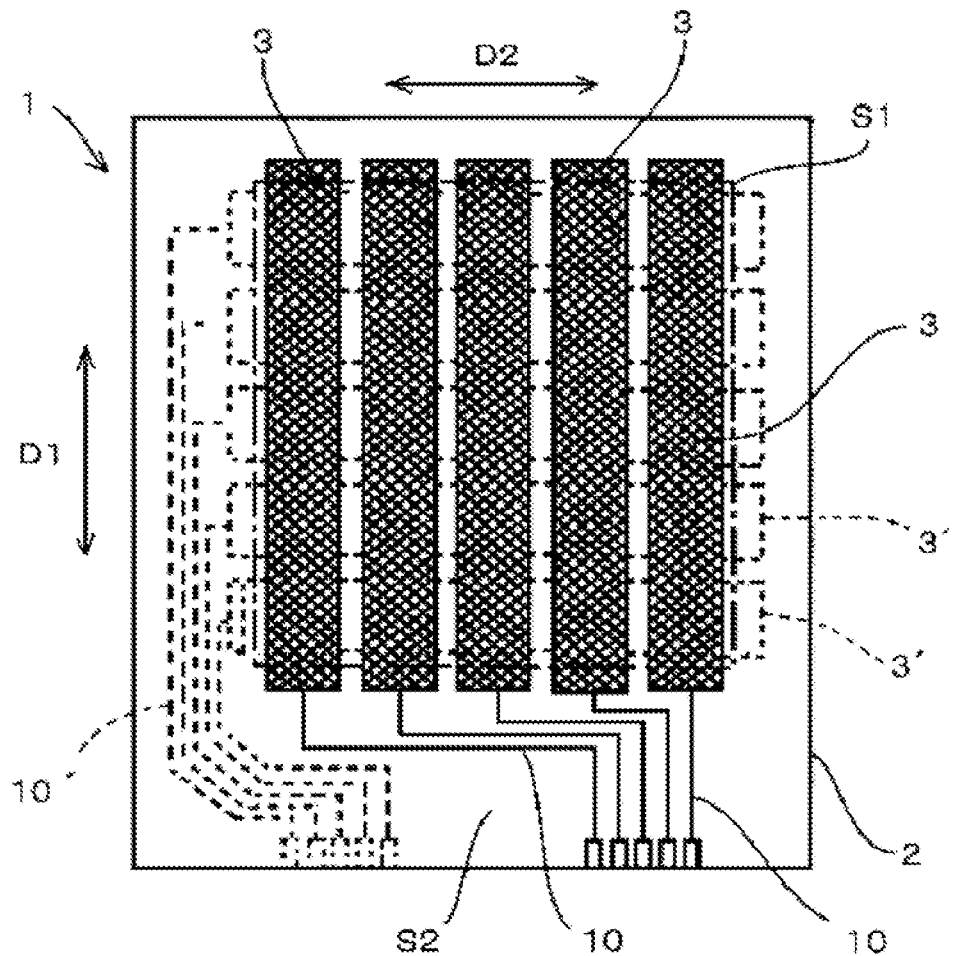
FIGS. 3A and 3B are schematic plan views illustrating a pattern of the metal mesh electrode of the present disclosure.

As illustrated in FIG. 3A, in the electrode film 1 used for a touch panel, an active area S1 that is transparent is defined, and a peripheral area S2 is defined outside of the active area S1.

In the active area S1, a plurality of metal mesh electrodes 3 each having a strip-like shape are formed, and the plurality of metal mesh electrodes 3 extend along a first direction D1 and are arrayed in parallel in a second direction D2 orthogonal to the first direction D1. The plurality of metal mesh electrodes 3 constitute detection electrodes of a touch panel.

Meanwhile, in the peripheral area S2, normally, a plurality of peripheral wiring lines 10 connected to the plurality of metal mesh electrodes 3 are formed of silver paste or the like (see FIG. 3A). Additionally, the peripheral wiring lines 10 may be subjected to patterning from the same metal layer 30 simultaneously with formation of the metal mesh electrodes 3.

As metal used for the metal mesh electrodes 3, for example, metal having conductivity high enough to be able to function as an electrode for a touch panel, such as gold, silver, copper, iron, nickel, and chromium is used. The film thickness of each of the metal mesh electrodes 3 is suitably changed in accordance with applied metal. For example, in the case of copper, the film thickness is from 0.02 μm to 2 μm, more preferably, from 0.04 μm to 1 μm. In the case of nickel, the film thickness is from 0.02 μm to 2 μm, more preferably, from 0.04 μm to 1 μm.

Such a metal mesh electrode 3 can be obtained by subjecting the metal layer 30 to patterning by etching (corrosion) using a photolithographic technique as described below.

Figure 3B:
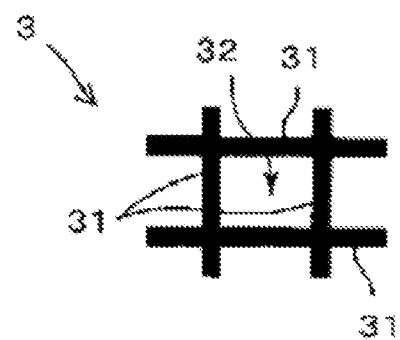

The electrode of the present disclosure has a mesh (a netting pattern or a lattice pattern) shape, and the line width of the thin wire line 31 constituting a mesh of the electrode is 2 μm to 7 μm, including covering with the black photoresist layer 4, and an opening part 32 surrounded by the thin wire line 31 has an opening rate of approximately from 95% to 99% (see FIG. 3B).

An important element to achieve a device sensitive to visibility like a touch panel is reduction of visibility of a pattern. Reduction in reflectivity of the metal mesh electrode 3 can be achieved by covering of the black photoresist layer 4 according to the present disclosure. However, when the line width of the thin wire line 31 of the metal mesh electrode 3 including covering with the black photoresist layer 4 exceeds 7 μm, normally, visibility with a human eye drastically increases. Additionally, when the line width of the thin wire line 31 of the metal mesh electrode 3 including covering with the black photoresist layer 4 is less than 2 μm, processing accuracy decreases.

The metal mesh electrode 3 preferably includes the opening part 32 formed into a quadrangle as illustrated in FIG. 3B or other polygonal shapes. In the case of the opening part 32 formed into a non-polygonal shape, for example, a circular shape or an elliptical shape, even when the opening parts 32 are disposed to be arrayed as much densely as possible, a contour includes thick portions between the opening parts 32. Thus, the thick portions of the contour are conspicuous, and also cause a decrease of a light beam transmittance. Additionally, among figures such as a triangle, a quadrangle, and a hexagon, one or more types thereof can be used in combination.

Note that, when a touch panel is constituted by using the electrode film 1 of the present embodiment, as indicated by broken lines in FIG. 3A, in the active area S1 on the side opposite to a surface of the transparent base material 2 in which the metal mesh electrodes 3 are formed, a plurality of metal mesh electrodes 3' each having a strip-like shape are disposed, and the plurality of metal mesh electrodes 3' extend along the second direction D2 and are arrayed in parallel in the first direction D1. Additionally, as indicated by the broken lines in FIG. 3A, in the peripheral area S2, a plurality of peripheral wiring lines 10' connected to the plurality of metal mesh electrodes 3' are provided by silver paste or the like.

Those metal mesh electrodes 3' and the peripheral wiring lines 10' can be constituted by preparing another electrode film 1 of the present embodiment and laminating two electrode films 1.

Black Photoresist Layer

The black photoresist layer 4 is an etching resist layer used for forming the above-described metal mesh electrode 3 in a step of manufacturing the electrode film 1.

Additionally, the black photoresist layer 4 is also a single layer colored with a coloring agent, and is also a blackening processing layer for the upper surface 31a and both the side surfaces 31b and 31c of the thin wire line 31 constituting the mesh of the above-described metal mesh electrode 3. Accordingly, reflectance in the upper surface 31a and both the side surfaces 31b and 31c of the thin wire line 31 including metal can be suppressed to be low, and a decrease of visibility of a screen can be prevented.

The black photoresist layer 4 can also be formed by lamination in a film form such as a dry film, or a liquid photoresist can be formed by a method such as printing and coating, and the formation of the black photoresist layer 4 is not necessarily limited to a certain form.

As a photoresist material of the black photoresist layer 4, a known negative type or positive type photosensitive resin is used. In the case of the negative type photosensitive resin, photo-crosslinking reaction is caused in an exposure site, and a non-exposure site is washed with alkali to leave a resist pattern. In the case of the positive type photosensitive resin, photo-degradation reaction is caused in an exposure site and development is performed with alkali to leave a non-exposure site and to form a resist pattern. A photosensitive resin layer is manufactured with various kinds of composition including a photopolymerizable monomer, a photopolymerization initiator, a binder polymer, and the like. As the positive type photosensitive resin, for example, a novolac resin, a phenol resin, or the like is used. As the negative type photosensitive resin, for example, an acrylic resin, an epoxy resin, or the like is used.

The coloring agent of the black photoresist layer 4 is normally a coloring agent having a black color.

Additionally, the coloring agent of the black photoresist layer 4 may be a coloring agent having a color being a color complementary to a color of metal used for the metal mesh electrode 3. The complementary color refers to a color pair that turns into a gray color or a black color due to light that passes through or is reflected by a color surface and causes a decrease of energy when two colors are mixed. For example, when copper is used for the metal mesh electrode 3, copper has a red-based color, and thus a resin colored with a blue-based color being complementary to the red-based color of copper is used. Accordingly, the two colors are mixed, and light can be absorbed.

Note that the coloring agent of the black photoresist layer 4 is normally a pigment excellent in heat resistance and light resistance and having an effect of covering and hiding a foundation of a surface to be colored. However, the pigment is present in a dispersed state without being dissolved, and thus caution to a dispersed state is required. A dye can also be used as the coloring agent, but has a higher transmittance and less heat resistance and light resistance than the pigment.

Additionally, in a case where the black photoresist layer 4 is formed by lamination in a film form having an even film thickness like a dry film, when the electrode film 1 is manufactured by a manufacturing method including a heating/softening step described below, the black photoresist layer 4 can be formed to cover the upper surface 31a of the thin wire line 31 by an even film thickness and to cover an edge of the upper surface 31a of the thin wire line 31 and each of both the side surfaces 31b and 31c of the thin wire line 31 with a curved surface (see FIG. 1 and FIG. 2).

Accordingly, the metal mesh electrode 3 covered with the black photoresist layer 4, that is, an upper surface of a black mesh electrode is visually recognized as being homogeneous due to smoothness of the upper surface of the black mesh electrode. Meanwhile, the upper surface and both side surfaces of the black mesh electrode have no corner portion, and have an ambiguous boundary. Thus, when the electrode film is seen obliquely, a mesh pattern is not conspicuous.

(2) Method for Manufacturing Electrode Film

With reference to the figures, description will be made on a method for manufacturing the electrode film of the first embodiment.

FIG. 4 to FIG. 10 are schematic cross-sectional views illustrating steps of manufacturing the electrode film in the first embodiment. For easy understanding, illustration is simplified.

Laminating Step

Figure 4:
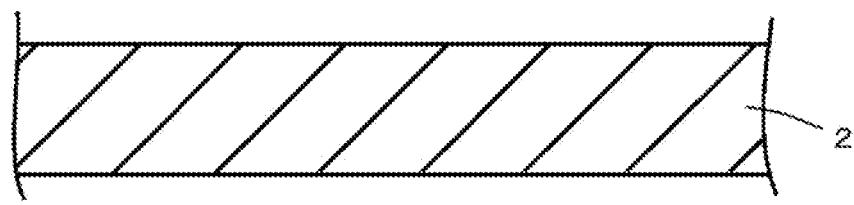
FIG. 4 is a schematic cross-sectional view illustrating a step of manufacturing the electrode film in the first embodiment.

First, as illustrated in FIG. 4, the transparent base material 2 is prepared.

Figure 5:
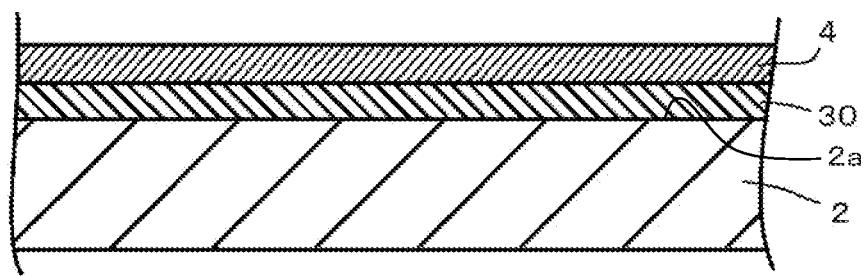
FIG. 5 is a schematic cross-sectional view illustrating a step of manufacturing the electrode film in the first embodiment.
Figure 6:
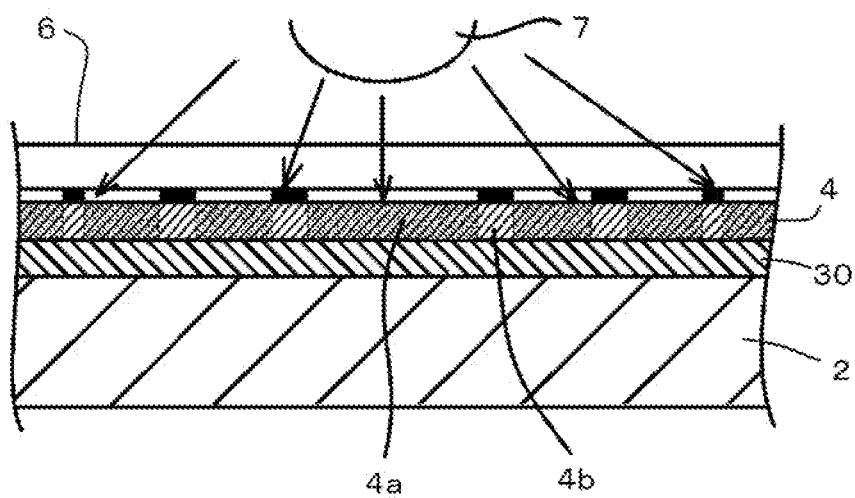
FIG. 6 is a schematic cross-sectional view illustrating a step of manufacturing the electrode film in the first embodiment.

Next, as illustrated in FIG. 5, the metal layer 30 and the black photoresist layer 4 are sequentially laminated on the first main surface 2a of the transparent base material 2.

As a method for forming the metal layer 30, any method such as a method including laminating a metal foil, a method including performing deposition from a vapor phase such as vapor deposition, sputtering, and ion plating, and a method including subjecting a surface of the transparent base material 2 to electroless plating may be used.

As a method for forming the black photoresist layer 4, the black photoresist layer 4 can be formed by lamination in the dry film form described above, or a liquid photoresist can be formed by a method such as printing and coating. The formation of the black photoresist layer 4 is not necessarily limited to a certain form. Accordingly, there is, for example, a method including solid formation of the black photoresist layer 4 on the upper surface of the metal layer 30. When a dry film is applied, a step cost can be reduced accordingly.

Exposure/Development Step

Figure 7:
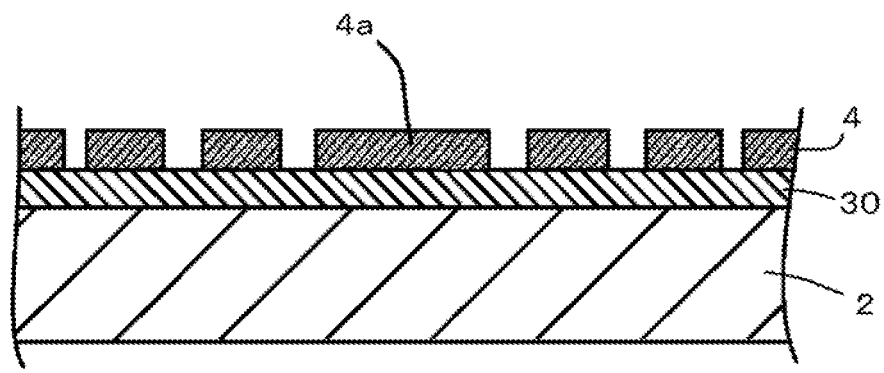
FIG. 7 is a schematic cross-sectional view illustrating a step of manufacturing the electrode film in the first embodiment.

Subsequently, the black photoresist layer 4 is partially exposed (see FIG. 6), and developed to subject the black photoresist layer 4 to patterning in a mesh shape (a netting pattern or a lattice pattern) (see FIG. 7).

When the black photoresist layer 4 is of a negative type, exposure is processing of curing an exposure area 4a of the black photoresist layer 4, and decreasing solubility with respect to a developing solution.

In contrast, when the black photoresist layer 4 is of a positive type, when the black photoresist layer 4 is exposed, solubility with respect to a developing solution increases in the exposure area 4a of the black photoresist layer 4.

Examples of an exposure method include digital exposure, and analog exposure.

Examples of the analog exposure are not particularly limited, and include a method including performing exposure with a light source 7 such as a (super) high-pressure mercury-vapor lamp, a xenon lamp, and a halogen lamp, via a photomask 6 having a predetermined pattern.

The digital exposure is not particularly limited as long as the photomask 6 is not used, and is preferably performed by, for example, moving at least any one of an exposure target and an exposure head including at least photo-irradiation means and photo-modulation means, and irradiating the exposure target by the exposure head while light emitted from the photo-irradiation means is modulated by the photo-modulation means in accordance with pattern information.

A light source for the digital exposure is not particularly limited as long as the light source emits light ranging from ultraviolet to near infrared ray, and a known light source such as a (super) high-pressure mercury-vapor lamp, a xenon lamp, a carbon arc lamp, a halogen lamp, a fluorescent tube for a copying machine and the like, and a laser is used. The light source is preferably, a (super) high-pressure mercury-vapor lamp or a laser, more preferably, a laser.

When the black photoresist layer 4 is of a negative type, development is processing of forming a pattern of the black photoresist layer 4 by removing a non-cured area 4b with use of a developing solution after the exposure area 4a is cured.

Examples of the developing solution are not particularly limited, and suitably include an aqueous solution of a hydroxide or a carbonate salt of an alkali metal or an alkaline earth metal, a hydrogencarbonate, ammonia water, or quaternary ammonium salt.

The developing solution may be used together with, for example, a surfactant, an anti-foaming agent, an organic base (for example, benzylamine, ethylenediamine, ethanolamine, tetramethylammonium hydroxide, diethylenetriamine, triethylene pentamine, morpholine, and triethanolamine), and an organic solvent for promoting development (for example, alcohols, ketones, esters, ethers, amides, and lactones). Additionally, the developing solution may be an aqueous developing solution obtained by mixing water or an alkali aqueous solution and an organic solvent, or may be an organic solvent alone.

When the black photoresist layer 4 is of a positive type, solubility with respect to the developing solution increases in the exposure area 4a of the black photoresist layer 4, and thus the exposure area 4a is removed.

The developing solution of a positive type is an alkali aqueous solution, and tetramethylammonium hydroxide (TMAH) is used most frequently.

Etching Step

Figure 8:
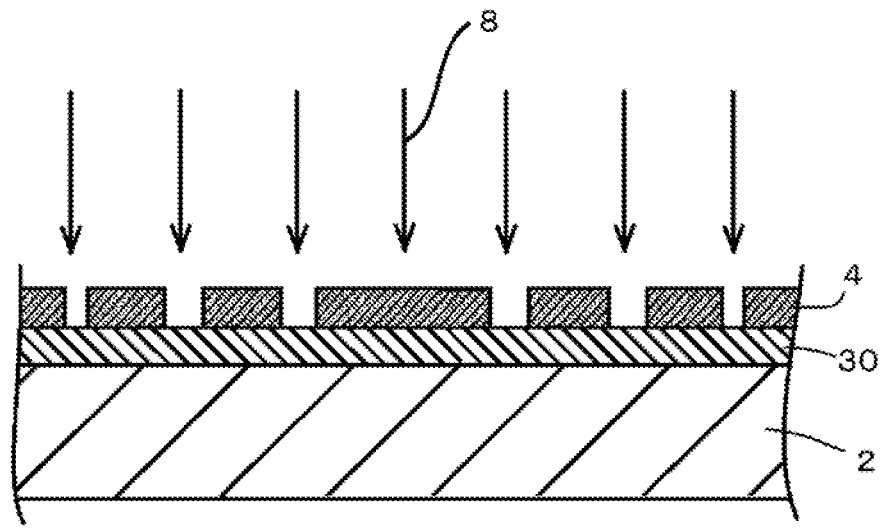
FIG. 8 is a schematic cross-sectional view illustrating a step of manufacturing the electrode film in the first embodiment.
Figure 9:
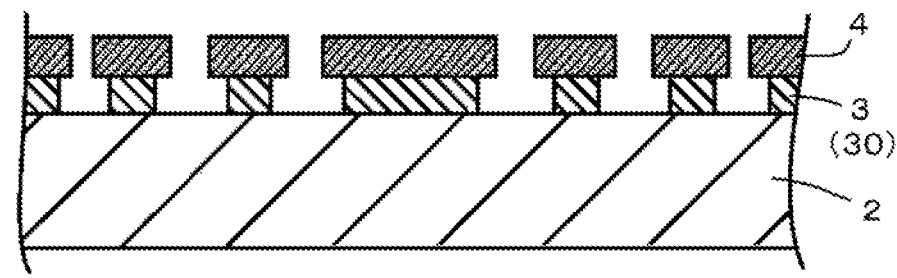
FIG. 9 is a schematic cross-sectional view illustrating a step of manufacturing the electrode film in the first embodiment.

Next, as illustrated in FIG. 8, the black photoresist layer 4 subjected to the patterning is used as an etching mask to subject the metal layer 30 to etching (see FIG. 9).

Accordingly, the metal layer 30 is processed into the metal mesh electrodes 3 in a desired pattern.

In this case, as illustrated in FIG. 9, the etching is performed until the metal mesh electrode 3 has the width smaller than the width of the thin wire line constituting the mesh of the black photoresist layer 4. That is, an edge portion of the metal layer 30 subjected to the patterning by the etching is present further inside of the pattern than an edge portion of the black photoresist layer 4 having the mask pattern. In other words, the edge portion of the black photoresist layer 4 having the mask pattern is in a state where the edge portion of the black photoresist layer 4 protrudes further outward of the pattern than the edge portion of the metal layer 30 subjected to the patterning by the etching.

In the case of a copper film, the etching is preferably performed by using a ferric chloride aqueous solution as an etchant 8.

Heating/Softening Step

Figure 10:
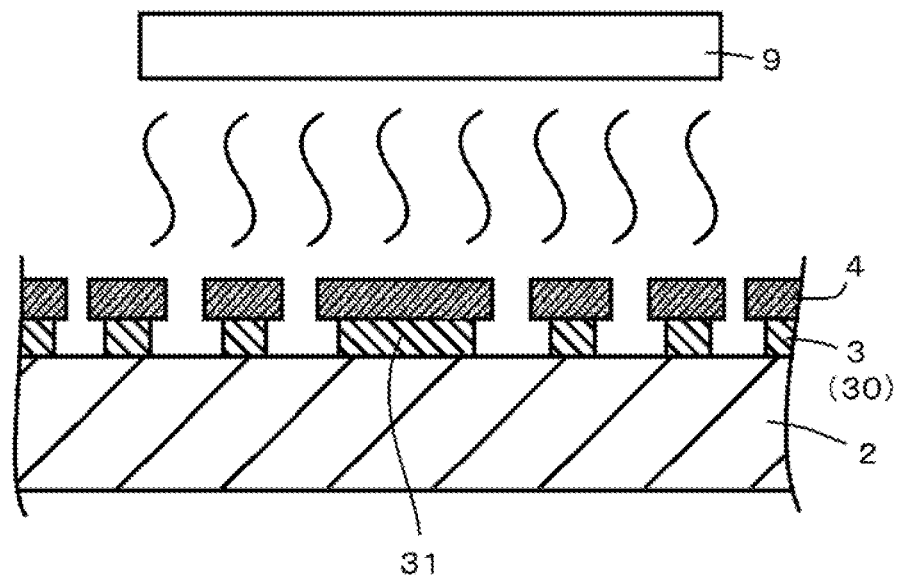
FIG. 10 is a schematic cross-sectional view illustrating a step of manufacturing the electrode film in the first embodiment.

Subsequently, the black photoresist layer 4 is heated and softened by a heater 9 in an oven (see FIG. 10).

Accordingly, the black photoresist layer 4 softened flows to cover not only the upper surface 31a but also both the side surfaces 31b and 31c of the thin wire line 31 constituting the mesh of the metal mesh electrode 3 (see FIG. 1).

(3) Reflection Prevention Effect of Black Photoresist Layer

Next, with reference to FIG. 2, description will be made on a reflection prevention effect of the electrode film of the present embodiment.

Figure 2:
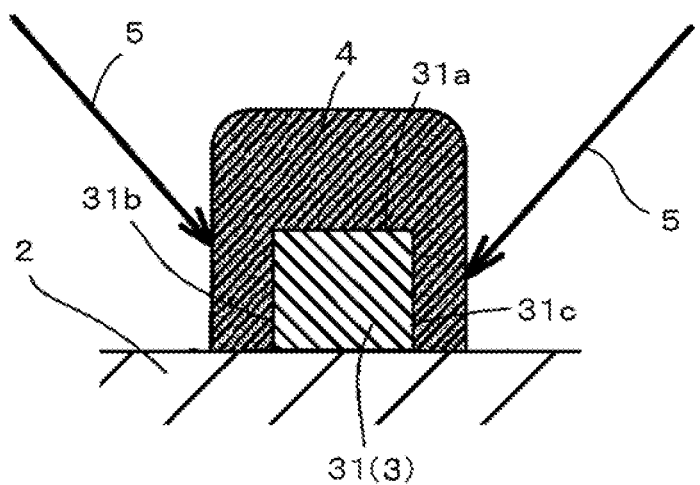
FIG. 2 is a view illustrating a cross-sectional shape of a metal mesh electrode of the present disclosure.

In the present embodiment illustrated in FIG. 2, as described above, the metal layer 30 processed by the etching has the width substantially equal to the width of the thin wire line constituting the mesh of the black photoresist layer 4. Subsequently, the metal layer 30 is further subjected to side etching and processed such that the metal mesh electrode 3 thus obtained has the width smaller than the width of the thin wire line constituting the mesh of the black photoresist layer 4. Subsequently, the black photoresist layer 4 is heated and softened, and the black photoresist layer 4 softened flows to cover not only the upper surface 31a but also both the side surfaces 31b and 31c of the thin wire line 31 constituting the mesh of the metal mesh electrode 3.

Thus, external light 5 indicated with arrows in FIG. 2 is absorbed by the black photoresist layer 4 covering both the side surfaces 31b and 31c of the thin wire line 31 constituting the mesh of the metal mesh electrode 3. Therefore, a decrease of visibility due to metallic luster in the metal side surfaces can be prevented.

(4) Example 1

Next, description will be made on an example of the first embodiment.

First, a colorless polyester film having a thickness of 200 µm and wound out from a roll was prepared as the transparent base material 2. Next, a copper film was formed by a thickness of 500 nm as the metal layer 30 by sputtering in all one surface of the transparent base material 2. Then, a dry film resist that includes a negative type acrylic-based photosensitive layer and enables development with a solution containing 1% of sodium carbonate and that contains a coloring agent was used to form the black photoresist layer 4 being a single layer by a film thickness of 3 µm in all a surface of the copper film and a conductive film was obtained.

Next, a mask is caused to overlap with the metal layer 30 side of the black photoresist layer 4 of the conductive film to perform exposure. Further, development is performed to peel off the black photoresist layer 4 in a non-exposure portion. In this step, the exposure is performed by a metal halide lamp, and the development is performed by immersion in a solution containing 1% of sodium carbonate.

Next, the conductive film from which excess of the black photoresist layer 4 is peeled off is subjected to water washing, and is subjected to etching. In this step, a ferric chloride aqueous solution is used as an etchant, and the conductive film including the black photoresist layer 4 subjected to the patterning is immersed in the etchant. Then, the metal layer 30 processed by the etching has the width substantially equal to the width (2 µm) of the thin wire line constituting the mesh of the black photoresist layer 4. Subsequently, the metal layer 30 is further subjected to side etching, and processed such that the metal mesh electrode 3 thus obtained has the width smaller than the width of the thin wire line constituting the mesh of the black photoresist layer 4 by 1 µm.

Next, the conductive film subjected to the etching is subjected to water washing. Further, the black photoresist layer 4 is heated and softened at an oven temperature of 100° C. for 20 minutes. The black photoresist layer 4 softened flows to cover not only the upper surface 31a but also both the side surfaces 31b and 31c of the thin wire line 31 having the line width of 1 μm and constituting the mesh of the metal mesh electrode 3 having an opening ratio of 97%.

According to the steps described above, the electrode film of the example is completed.

2. Second Embodiment

In the first embodiment, description is made on the electrode film 1 including the metal mesh electrode 3 and the black photoresist layer 4 on the first main surface 2a of the transparent base material 2. However, the present disclosure is not limited to this embodiment.

For example, in a method for manufacturing an electrode film 1, two conductive films obtained in a step of sequentially laminating a metal layer and a black photoresist layer on a first main surface of a transparent base material may be used, and after the black photoresist layer is laminated to be the outermost layer, the subsequent steps may be performed in the same manner as in the first embodiment (second embodiment).

Figure 11:
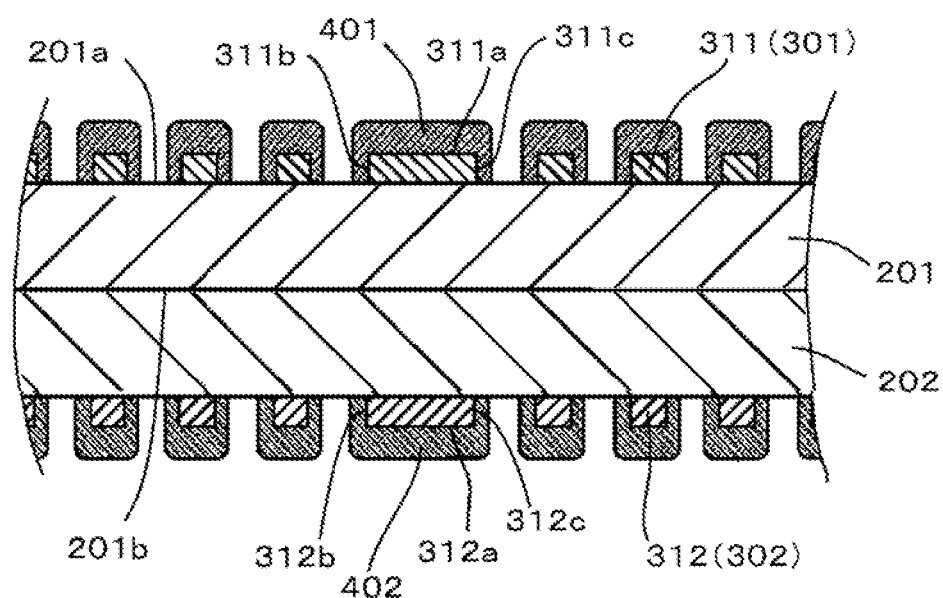
FIG. 11 is a schematic cross-sectional view illustrating a step of manufacturing an electrode film in a second embodiment.

In this case, as illustrated in FIG. 11, the electrode film includes a first transparent base material 201, a first metal mesh electrode 301 provided on a first main surface 201a of the first transparent base material 201, a first black photoresist layer 401 provided in an upper surface 311a and both side surfaces 311b and 311c of a thin wire line 311 constituting a mesh of the first metal mesh electrode 301, a second transparent base material 202 laminated on a second main surface 201b of the first transparent base material 201, a second metal mesh electrode 302 provided on a surface opposite to the first transparent base material 201 of the second transparent base material 202, and a second black photoresist layer 402 provided in an upper surface 312a and both side surfaces 312b and 312c of a thin wire line 312 constituting a mesh of the second metal mesh electrode 302.

3. Third Embodiment

Additionally, in a method for manufacturing an electrode film, a metal layer and a black photoresist layer may be laminated sequentially on each of a first main surface and a second main surface of a transparent base material (third embodiment).

Figure 12:
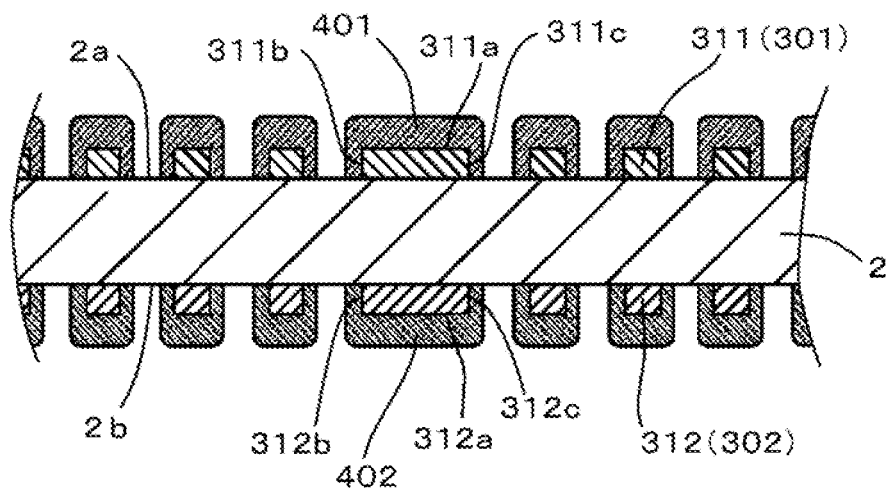
FIG. 12 is a schematic cross-sectional view illustrating a step of manufacturing an electrode film in a third embodiment.

In this case, as illustrated in FIG. 12, the electrode film includes a transparent base material 2, a first metal mesh electrode 301 provided on a first main surface 2a of the transparent base material 2, a first black photoresist layer 401 provided on an upper surface 311a and both side surfaces 311b and 311c of a thin wire line 311 constituting a mesh of the first metal mesh electrode 301, a second metal mesh electrode 302 provided on a second main surface 2b of the transparent base material 2, and a second black photoresist layer 402 provided on an upper surface 312a and both side surfaces 312b of a thin wire line 312 constituting a mesh of the second metal mesh electrode 302.

4. Fourth Embodiment

(1) Electrode Film 100

Figure 13:
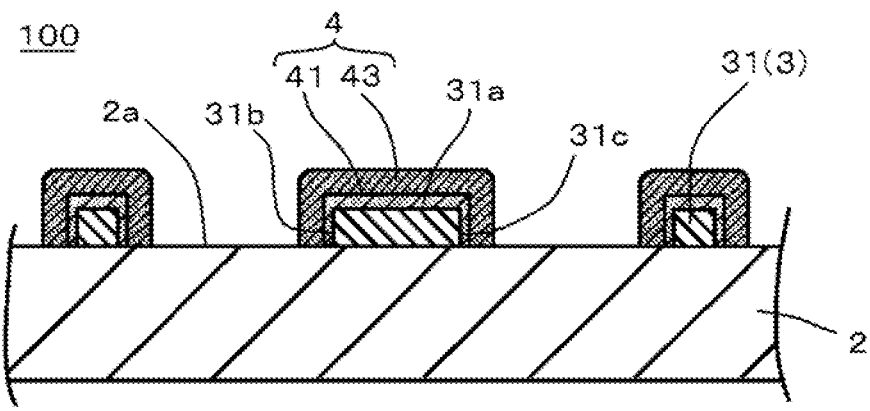
FIG. 13 is a schematic cross-sectional view illustrating a configuration of an electrode film in a fourth embodiment.

Additionally, a black photoresist layer 4 may not include a single layer configuration like the first to third embodiments. For example, as illustrated in FIG. 13, the black photoresist layer 4 may include a multi-layered configuration (a two-layer configuration in FIG. 13) including a heat flowable photoresist layer 41 and a heat non-flowable photoresist layer 43 provided on the heat flowable photoresist layer 41. In terms of a positional relationship, the heat flowable photoresist layer 41 is a lower photoresist layer, and the heat non-flowable photoresist layer 43 is an upper photoresist layer.

FIG. 13 is a schematic cross-sectional view illustrating a configuration of an electrode film according to a fourth embodiment. For easy understanding, illustration is simplified.

In the following, description that is common to the first to third embodiments will be omitted as much as possible.

Herein, heat flowability refers to nature in which at the time of heating and softening the black photoresist layer 4, an overhang portion protruding without being in contact with an upper surface 31a of a thin wire line 31 constituting a mesh of a metal mesh electrode 3 entirely loses evenness exerted before the heating and flows.

Additionally, herein, heat non-flowability refers to nature in which at the time of heating and softening the black photoresist layer 4, an overhang portion protruding without being in contact with the upper surface 31a of the thin wire line 31 constituting the mesh of the metal mesh electrode 3 does not flow while maintaining evenness exerted before the heating, except for a periphery of a root of the overhang portion.

As photoresist materials of the heat flowable photoresist layer 41 and the heat non-flowable photoresist layer 43, a negative type or positive type photosensitive resin is used in the same manner as the black photoresist layer 4 being a single layer. However, a difference from the black photoresist layer 4 being a single layer is in that in accordance with setting of an oven temperature at the time of heating and softening, a combination of a resin that loses evenness and flows at the temperature and a resin that does not flow while maintaining evenness at the temperature is suitably selected.

Note that the photoresist materials of the heat flowable photoresist layer 41 and the heat non-flowable photoresist layer 43 have different softening points. For example, the softening point of the heat non-flowable photoresist layer 43 is preferably higher than the softening point of the heat flowable photoresist layer 41 by 20° C. or more.

Figure 14:
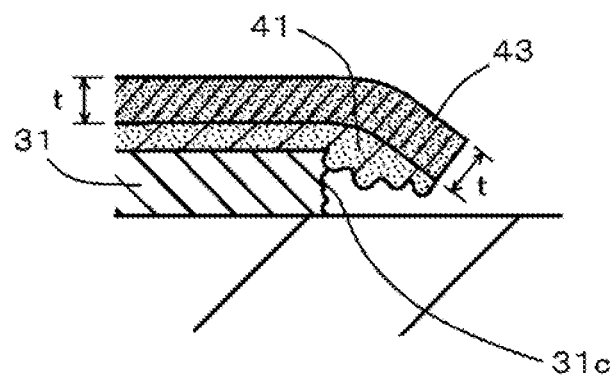
FIG. 14 is a partial cross-sectional view illustrating a state of heating and softening of a black photoresist layer in the fourth embodiment.
Figure 15:
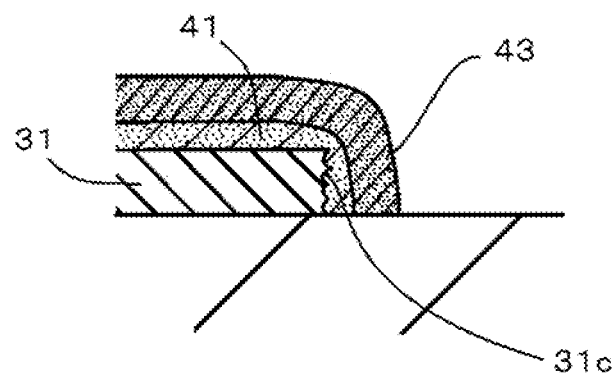
FIG. 15 is a partial cross-sectional view illustrating the state of heating and softening of the black photoresist layer in the fourth embodiment.

Accordingly, the overhang portion of the heat non-flowable photoresist layer 43 being the upper layer flows due to its own weight while maintaining evenness t (see FIG. 14), and the upper surface 31a and both the side surfaces 31b and 31c of the thin wire line of the metal mesh electrode 3 are covered with the heat non-flowable photoresist layer 43 (see FIG. 15). In this case, the periphery of the root of the overhang portion slightly flows due to bending, but is continuous to other portions that maintain evenness t, and thus does not largely reduce the film thickness.

Therefore, a boundary between the upper surface and each of the side surfaces of the thin wire line, that is, a so-called shoulder portion is prevented from jutting out of the black photoresist layer 4 and being exposed.

Note that, after the heat non-flowable photoresist layer 43 being the upper layer is bent, and a distal end of the heat non-flowable photoresist layer 43 comes into contact with a transparent base material 2, the heat flowable photoresist layer 41 being the lower layer does not further largely flow to, for example, spread between the thin wire lines 31. This is because, as illustrated in FIG. 13 and FIG. 15, the thin wire line 31, the heat non-flowable photoresist layer 43 being the upper layer, and the transparent base material 2 define a shape of the heat flowable photoresist layer 41 being the lower layer.

Meanwhile, due to flowability of the heat flowable photoresist layer 41, the heat flowable photoresist layer 41 being the lower layer fills a gap between the side surfaces 31b and 31c of the thin wire line 31 and the heat non-flowable photoresist layer 43 being the upper layer. The side surfaces 31b and 31c of the thin wire line 31 include irregularities due to etching (see FIG. 14), and due to flow of the heat flowable photoresist layer 41 being the lower layer, the black photoresist layer 4 can cover the side surfaces 31b and 31c of the thin wire line 31 without generating fine bubbles (see FIG. 15). As a result, the black photoresist layer 4 firmly adheres to the side surfaces 31b and 31c of the thin wire line 31.

Note that, in the present embodiment, at least any one of the heat flowable photoresist layer 41 and the heat non-flowable photoresist layer 43 may be colored. Additionally, for a reason described below, only any one of the heat flowable photoresist layer 41 and the heat non-flowable photoresist layer 43 may be colored.

As illustrated in FIG. 13, the black photoresist layer 4 includes a configuration including only two layers, a thickness ratio of the heat flowable photoresist layer 41 and the heat non-flowable photoresist layer 43 is preferably from 1:2 to 1:4.

Accordingly, a thickness proportion of the heat non-flowable photoresist layer 43 is higher than a thickness proportion of the heat flowable photoresist layer 41, and thus evenness of all the black photoresist layer increases. Therefore, even when all the black photoresist layer 4 including a multi-layered configuration is colored, color unevenness is less likely to be caused in the black photoresist layer 4.

Additionally, only the heat non-flowable photoresist layer 43 may be colored.

Accordingly, the colored layer is a layer that maintains evenness exerted before heating, and thus color unevenness is less likely to be caused in the black photoresist layer 4. Therefore, more excellent invisibility of a mesh pattern and visibility of an image can be obtained.

In contrast, only the heat flowable photoresist layer 41 may be colored.

Accordingly, the film thickness of the layer having a block color and covering both the side surfaces 31b and 31c of the thin wire line 31 of the metal mesh electrode 3 is reduced, and thus the width of a black thin wire line can be reduced as viewed from the front. Therefore, more excellent invisibility of a mesh pattern and visibility of an image can be obtained.

Note that, in this case, the presence of the heat non-flowable photoresist layer 43 formed on the heat flowable photoresist layer 41 colored exerts effects other than an effect of preventing the above-described shoulder part of the thin wire line 31 of the metal mesh electrode 3 from jutting out of the black photoresist layer 4 and being exposed. For example, a good cushioning property is exerted when the black photoresist layer 4 is laminated, and formation of creases can also be prevented.

(2) Method for Manufacturing Electrode Film

With reference to the figures, description will be made on a method for manufacturing the electrode film of the fourth embodiment.

FIG. 16 to FIG. 21 are schematic cross-sectional views illustrating steps of manufacturing the electrode film in the fourth embodiment. For easy understanding, illustration is simplified.

The method for manufacturing the electrode film 100 of the present embodiment is similar to those in the first to third embodiments except that the black photoresist layer 4 includes a multi-layered configuration.

In the following, description that is common to the first to third embodiments will be omitted as much as possible.

Laminating Step

Figure 16:
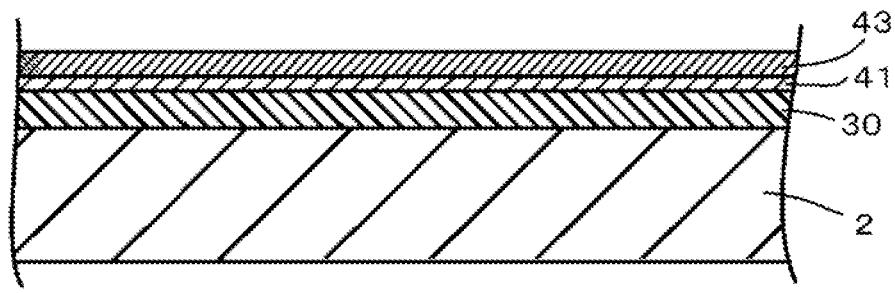
FIG. 16 is a schematic cross-sectional view illustrating a step of manufacturing the electrode film in the fourth embodiment.

First, as illustrated in FIG. 16, a metal layer 30, the heat flowable photoresist layer 41, and the heat non-flowable photoresist layer 43 are sequentially laminated on a first main surface 2a of the transparent base material 2.

Exposure/Development Step

Subsequently, the black photoresist layer 4 including a two-layer configuration and provided with the heat non-flowable photoresist layer 43 on the heat flowable photoresist layer 41 is partially exposed (see FIG. 17), and developed to be subjected to patterning in a mesh shape (a netting pattern or a lattice pattern) (see FIG. 18).

Figure 17:
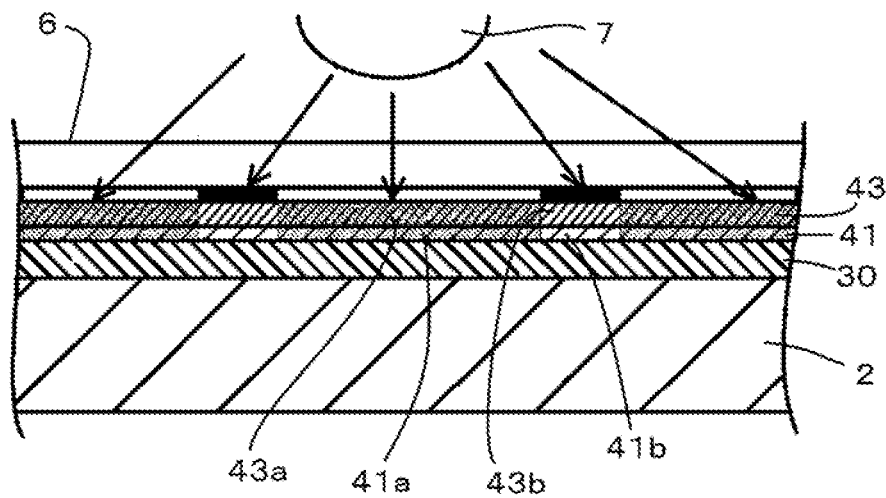
FIG. 17 is a schematic cross-sectional view illustrating a step of manufacturing the electrode film in the fourth embodiment.
Figure 18:
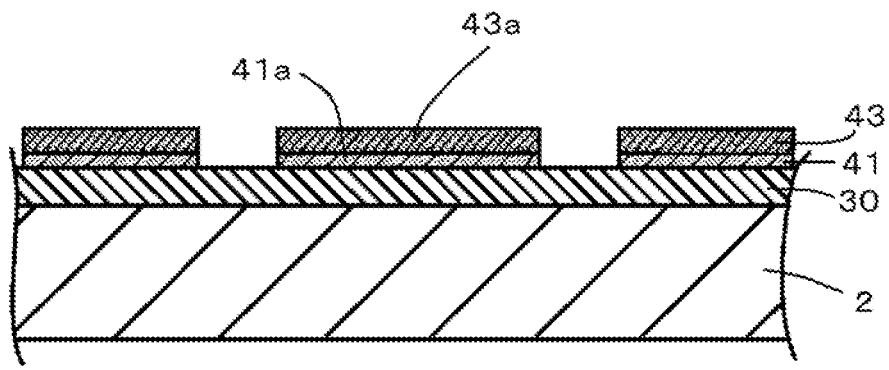
FIG. 18 is a schematic cross-sectional view illustrating a step of manufacturing the electrode film in the fourth embodiment.

FIG. 17 and FIG. 18 illustrate the case where each layer of the black photoresist layer 4 is of a negative type. An exposure area 41a of the heat flowable photoresist layer 41 and an exposure area 43a of the heat non-flowable photoresist layer 43 are cured by exposure to decrease solubility with respect to a developing solution. After the exposure areas 41a and 43a are cured, the developing solution is used to remove a non-cured area 41b of the heat flowable photoresist layer 41 and a non-cured area 43b of the heat non-flowable photoresist layer 43, and accordingly, the pattern of the black photoresist layer 4 including a two-layer configuration is formed.

The heat flowable photoresist layer 41 and the heat non-flowable photoresist layer 43 of the black photoresist layer 4 thus obtained each have nature of exerting heat flowability or not with respect to a heating condition at a subsequent heating/softening step.

Note that a softening point of a photoresist film is basically determined by a combination of a resin material, a photosensitizer, a residual solvent, an additive, and the like, and in general, when an average molecule amount of the resin material is increased, the softening point increases, and when the average molecule amount is reduced, the softening point decreases. The softening point can be measured by a thermo mechanical analyzer (TMA).

Etching Step

Figure 19:
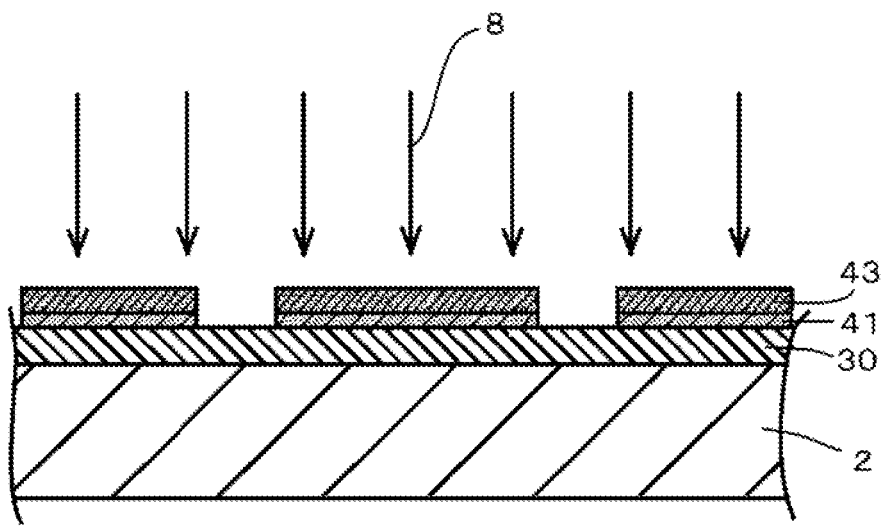
FIG. 19 is a schematic cross-sectional view illustrating a step of manufacturing the electrode film in the fourth embodiment.

Next, as illustrated in FIG. 19, the heat non-flowable photoresist layer 43 on the heat flowable photoresist layer 41 subjected to the patterning is used as an etching mask to subject the metal layer 30 to etching with an etchant 8.

Figure 20:
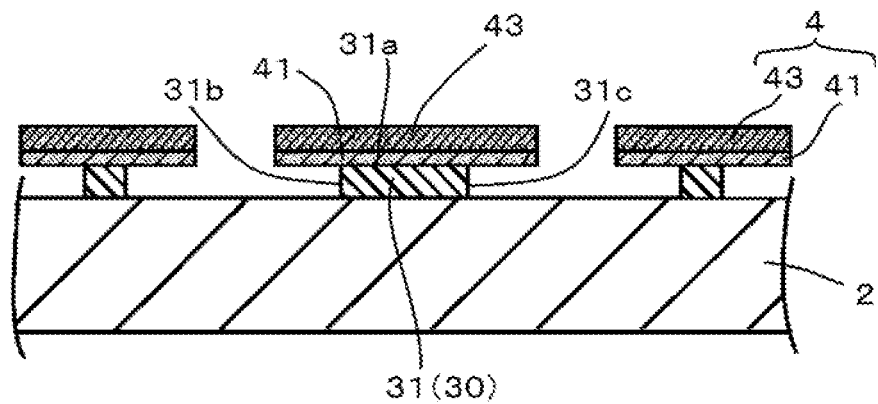
FIG. 20 is a schematic cross-sectional view illustrating a step of manufacturing the electrode film in the fourth embodiment.

In this case, as illustrated in FIG. 20, the etching is performed until the width of the thin wire line 31 constituting the metal mesh electrode 3 becomes the width smaller than the width of the thin wire line constituting the mesh of the black photoresist layer 4 including a two-layer configuration described above. That is, an edge portion of the metal layer 30 subjected to the patterning by the etching is present further inside of the pattern than an edge portion of the black photoresist layer 4 including a two-layer configuration described above and having the mask pattern. In other words, the edge portion of the black photoresist layer 4 including a two-layer configuration described above and having the mask pattern is in a state where the edge portion of the black photoresist layer 4 protrudes like overhang further outward of the pattern than the edge portion of the metal layer 30 subjected to the patterning by the etching.

Heating/Softening Step

Figure 21:
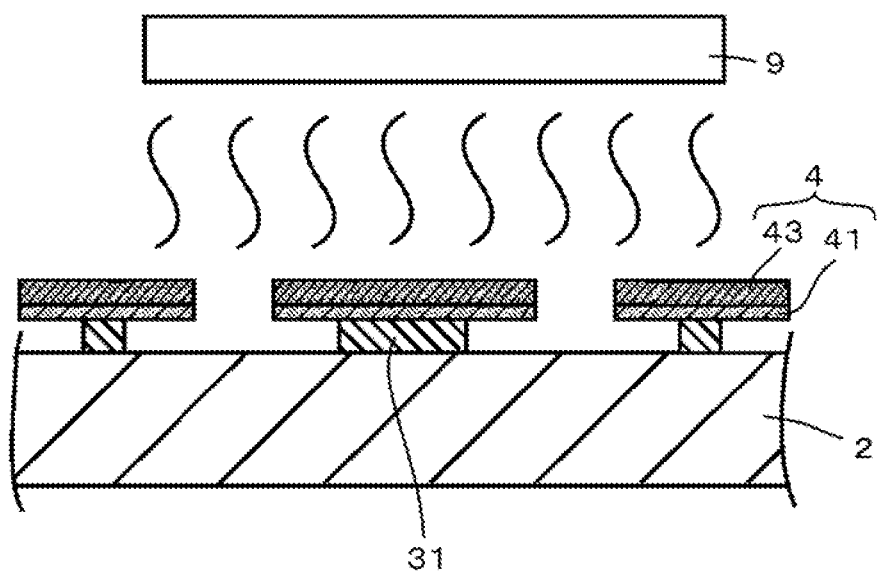
FIG. 21 is a schematic cross-sectional view illustrating an example of a configuration of the electrode film in the fourth embodiment.

Subsequently, the black photoresist layer 4 including a two-layer configuration described above is heated and softened by a heater 9 in an oven (see FIG. 21).

The black photoresist layer 4 includes a two-layer configuration including the heat flowable photoresist layer 41 and the heat non-flowable photoresist layer 43 provided on the heat flowable photoresist layer 41. This is a combination of a resin that loses evenness and flows at an oven temperature (heating condition) at the time of heating and softening and a resin that does not flow while maintaining evenness at the temperature, and each of the resins includes a material suitably selected in accordance with setting of the temperature and subjected to pattern formation.

Accordingly, the heat flowable photoresist layer 41 loses evenness exerted before heating and flows at the time of heating and softening. As a result, the heat flowable photoresist layer 41 includes the portion protruding like overhang with respect to the edge portion of the thin wire line 31 constituting the metal mesh electrode 3, and the portion falls along both the side surfaces 31*b* and 31*c* of the thin wire line 31 (see FIG. 14 and FIG. 15).

Meanwhile, at the time of heating and softening, the heat non-flowable photoresist layer 43 being the upper layer does not flow while maintaining evenness. The heat non-flowable photoresist layer 43 includes the portion protruding like overhang with respect to the edge portion of the thin wire line 31 constituting the metal mesh electrode 3, and the portion simply bends due to its own weight toward both the side surfaces 31*b* and 31*c* of the thin wire line 31 (see FIG. 14 and FIG. 15).

(3) Example 2

Next, description will be made on an example of the fourth embodiment.

This example is different from Example 1 in that the black photoresist layer 4 includes a two-layer configuration including negative type acrylic-based photosensitive layers enabling development with a solution containing 1% of sodium carbonate; that the two layers having different heat flowability at an oven temperature of 100° C. for 20 minutes are subjected to pattern formation as the heat flowable photoresist layer 41 having a film thickness of 1 µm and a softening point of 70° C. and the heat non-flowable photoresist layer 43 having a film thickness of 2 µm and a softening point of 90° C. and formed on the heat flowable photoresist layer 41; and that only the heat non-flowable photoresist layer 43 being the upper layer contains a coloring agent.

5. Fifth Embodiment

Additionally, a black photoresist layer 4 may have a rustproof function (fifth embodiment).

In the following, description that is common to the first to fourth embodiments will be omitted as much as possible.

For example, when the black photoresist layer 4 includes a single layer configuration in the same manner as in the first to third embodiments, the black photoresist layer 4 including a rustproof agent added to the above-described photoresist material is used.

As the rustproof agent, a material already publicly known and used as a rustproof agent is used. Specific examples of the rustproof agent include imidazole, triazole, benzotriazole, benzimidazole, benzothiazole, and pyrazole. Additionally, examples of the rustproof agent include halogen thereof, monocyclic or polycyclic azoles such as substituted alkylphenyl, aromatic amines such as aniline, a fatty amine such as alkylamine, and salts thereof. However, the rustproof agent is not required to be particularly limited to the materials described herein.

In this manner, the black photoresist layer 4 has a rustproof function, and thus even when corrosive liquid from the outside enters or even under an environmental test such as high-temperature and high-humidity, corrosion does not progress to the mesh electrode, and electrical characteristics can be maintained. Additionally, it is not required to separately provide a rustproof layer.

Figure 22:
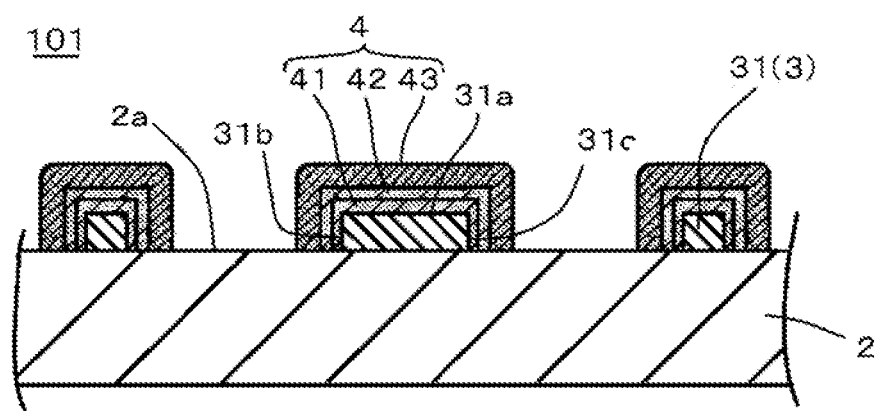
FIG. 22 is a schematic cross-sectional view illustrating an example of a configuration of an electrode film in a fifth embodiment.

Additionally, when the black photoresist layer 4 includes a multi-layered configuration in the same manner as in the fourth embodiment, a rustproof resist layer 42 may be provided between a heat flowable photoresist layer 41 and a heat non-flowable photoresist layer 43 as in an electrode film 101 illustrated in FIG. 22.

In this manner, the rustproof resist layer 42 is separately provided to make a three-layer configuration, and thus different layers can contain a rustproof agent and a coloring agent. Specifically, the heat non-flowable photoresist layer 43 being an upper layer contains a coloring agent, and the rustproof resist layer 42 being an intermediate layer contains a rustproof agent. The functions are divided, and thus an optimal material can be adopted in each layer.

A photoresist material of the rustproof resist layer 42 being the intermediate layer is only required to be a negative type or positive type photosensitive resin, and is not particularly limited. The photoresist material may have any of heat flowability and heat non-flowability.

Further, even when the black photoresist layer 4 includes a multi-layered configuration in the same manner as in the fourth embodiment, the heat flowable photoresist layer 41 in the two-layer configuration may contain a rustproof agent instead of separately providing the rustproof resist layer 42.

In this manner, when the configuration in which the heat flowable photoresist layer 41 also functions as a rust proof agent is made, the number of layers laminated in the black photoresist layer 4 is reduced, and thus a film formation step is facilitated.

Note that in the black photoresist layer 4 having a rustproof function and including a multi-layered configuration, only the heat non-flowable photoresist layer 43 may be colored.

As described above, the colored layer is a layer that maintains evenness exerted before heating, and thus color unevenness is less likely to be caused in the black photoresist layer 4.

6. Other Embodiments

The one or more embodiments of the present disclosure are described above. However, the present disclosure is not limited to the above-described embodiments, and various modifications can be made without departing from the spirit of the disclosure. In particular, the plurality of embodiments and modifications described herein can be combined with one another optionally as needed.

The outer shape pattern of the metal mesh electrode 3 is not limited to a strip-like shape extending along the first direction D1 described above (see FIG. 3A), and a known pattern for achieving a touch panel of an electrostatic capacity type can be used. An electrode having another shape in which, for example, a plurality of electrode portions each have a triangle, a quadrangle, and a hexagon and are continuous along the first direction D1 may be used.

The thickness of the black photoresist layer 4 is preferably from 2 μm to 15 μm.

The thickness is 2 μm or more, and thus the metal mesh electrode 3 is excellent in scratch resistance.

The thickness is 15 μm or less, and thus even when the electrode film 1 is used being bent, formation of a crack in the black photoresist layer 4 can be prevented. Additionally, patterning with a high resolution can be achieved.

Additionally, when the black photoresist layer 4 includes a multi-layered configuration, the total thickness of the colored layers of the black photoresist layer 4 is preferably 2 μm or more.

When the total thickness is 2 μm or more, an optical density (OD) value increases. That is, a light transmittance in the black photoresist layer 4 reduces, and scattering and reflection of external light in the metal mesh electrode 3 can be suppressed more reliably.

Additionally, other layers may be provided as needed.

A material and the thickness of each layer is not limited to those in the embodiments.

An electrode film according to the present disclosure can be used preferably as a touch panel sensor, and a touch panel including the touch panel sensor can be used preferably as a touch panel mounted in a compact mobile terminal, electronic paper, a computer display, a compact game machine, a display surface of an automatic teller machine, a display surface of a ticket vending machine, or the like. Note that such display device may be any one of a liquid crystal display device (LCD), a plasma display device (PDP), an electroluminescent (EL) display device, a cathode ray tube (CRT) display device, an electrophoresis display device, and the like.

Additionally, the electrode film according to the present disclosure can be used preferably as a transparent antenna element. The transparent antenna element includes both of transparency and a transmission/reception function, and thus can be used for various types of transparent antennas.

The transparent antenna can be used preferably by being attached to a site that requires transparency. Particularly, the transparent antenna can be used for receiving a ground wave and satellite broadcasting by being attached in a display front surface of a mobile communication device such as a mobile phone.

The invention claimed is:

1. An electrode film, comprising:
   a transparent base material;
   a metal mesh electrode provided on a first main surface of the transparent base material; and
   a black photoresist layer provided on an upper surface and both side surfaces of a thin wire line constituting a mesh of the metal mesh electrode,
   the black photoresist layer including a multi-layered configuration that includes a heat flowable photoresist layer and a heat non-flowable photoresist layer provided on the heat flowable photoresist layer, at least one of the heat flowable photoresist layer or the heat non-flowable photoresist layer, or both, being colored.

2. The electrode film according to claim 1, wherein the heat non-flowable photoresist layer has a softening point higher than a softening point of the heat flowable photoresist layer by 20° C. or more.

3. The electrode film according to claim 1, wherein the black photoresist layer includes only two layers including the heat flowable photoresist layer and the heat non-flowable photoresist layer, and a thickness ratio of the heat flowable photoresist layer and the heat non-flowable photoresist layer is from 1:2 to 1:4.

4. The electrode film according to claim 1, wherein a rustproof resist layer is provided between the heat flowable photoresist layer and the heat non-flowable photoresist layer.

5. The electrode film according to claim 1, wherein the heat flowable photoresist layer contains a rustproof agent.

6. The electrode film according to claim 1, wherein only the heat non-flowable photoresist layer is colored.

7. The electrode film according to claim 1, wherein only the heat flowable photoresist layer is colored.

8. A method for manufacturing an electrode film, the method comprising the steps of:
   laminating a metal layer on a first main surface of a transparent base material, and further laminating, on the metal layer, a black photoresist layer including a multi-layered configuration that includes a heat flowable photoresist layer and a heat non-flowable photoresist layer provided on the heat flowable photoresist layer, at least one of the heat flowable photoresist layer or the heat non-flowable photoresist layer, or both, being colored;
   subjecting the black photoresist layer to patterning in a mesh shape by partially exposing the black photoresist layer and performing development;
   processing the metal layer into a metal mesh electrode by subjecting the metal layer to etching by using the black photoresist layer subjected to the patterning as an etching mask until the metal layer has a width smaller than a width of a thin wire line constituting a mesh of the black photoresist layer; and
   covering an upper surface and both side surfaces of a thin wire line constituting a mesh of the metal mesh electrode with the black photoresist layer by heating and softening the black photoresist layer to cause the black photoresist layer softened to flow.

9. The method for manufacturing an electrode film according to claim 8, wherein the heat non-flowable photoresist layer has a softening point higher than a softening point of the heat flowable photoresist layer by 20° C. or more.

10. The method for manufacturing an electrode film according to claim 8, wherein the black photoresist layer includes only two layers including the heat flowable photoresist layer and the heat non-flowable photoresist layer, and a thickness ratio of the heat flowable photoresist layer and the heat non-flowable photoresist layer is from 1:2 to 1:4.

11. The method for manufacturing an electrode film according to claim 8, wherein a rustproof resist layer is provided between the heat flowable photoresist layer and the heat non-flowable photoresist layer.

12. The method for manufacturing an electrode film according to claim 8, wherein the heat flowable photoresist layer contains a rustproof agent.

13. The method for manufacturing an electrode film according to claim 8, wherein only the heat non-flowable photoresist layer is colored.

14. The method for manufacturing an electrode film according to claim 8, wherein only the heat flowable photoresist layer is colored.

* * * * *